United States Patent Office 3,729,399
Patented Apr. 24, 1973

3,729,399
GAS CONTROL METHOD AND APPARATUS
Robert M. Kibby, Florence, Ala., assignor to Reynolds Metals Company, Richmond, Va.
Filed July 13, 1971, Ser. No. 162,198
Int. Cl. C22d 3/12
U.S. Cl. 204—67                                              19 Claims

ABSTRACT OF THE DISCLOSURE

The crust of an alumina reduction cell is periodically pierced and concentrated cell fumes are directed to a concentrated-fume collector for passage to a concentrated-fume processor. A variable output blower directs air upwardly over the cell for directing dilute fumes toward a dilute-fume collector for passage to a dilute-fume processor.

BACKGROUND OF THE INVENTION

It is customary to provide means for collecting fumes from aluminum reduction cells and directing the fumes to suitable treatment apparatus. One method of collecting such fumes is to substantially enclose the cell's entire anode area. These enclosures often contain shields or skirts which extend outwardly from above the cell's anode and downwardly to the cell's outer shell. These shields are adapted to slide or swing upwardly so that individual carbons, in the case of a prebake cell for example, can be adjusted or so that the operator can merely view the cell.

When the shields on the above described structures are closed the cell's gases are withdrawn to suitable scrubbers where the fluoride effluents can be efficiently removed. When the shields are opened to set carbons, for example, the gases are diluted so as to result in the requirement for more expensive equipment to efficiently treat the effluent gases. Hence, it is an object of this invention to provide an improved method and apparatus for both collecting concentrated fumes during normal feeding and anode effect conditions of a cell; and also collecting dilute fumes during carbon setting operations.

One of the major drawbacks of shields is that they both prevent the cell's operators from viewing the anode carbons during the cell's operation and also confine the cell's heat so as to prevent the anode carbons from being cooled. Hence, it is another object of this invention to provide a method and apparatus for gathering both concentrated and dilute effluent gases without the use of shields which unduly restrict the cell operator's view of the cell and confine the cell's heat about its carbon anodes.

When the shielded types of cells are opened to permit the operators to adjust carbons, the cell's fumes have a tendency to move toward the operator. Consequently, it is still another object of this invention to provide a method and apparatus for reducing the amount of fumes to which an operator is exposed during the time he is adjusting a cell's anodes for otherwise controlling the cell.

SUMMARY OF THE INVENTION

In accordance with the present invention one or more concentrated fume ducts are provided for gathering the concentrated gases evolved from the cell through holes in the crust and directing them to a concentrated fume processor such as an electrostatic precipitator or the like prior to their being delivered to a dilute fume processor such as a wet scrubber. At the same time, a curtain of air is directed upwardly from the cell's outer edges and inwardly toward a dilute fume conduit above the anode carbons. This air curtain entrains other fumes escaping from the cell, particularly during times of carbon adjustment, so that the thusly collected fumes are directed to the dilute fume conduit from which they are delivered directly to the dilute fume processor. In this manner, the method and apparatus of the invention permits the concentrated fumes to be treated in a manner most efficient for concentrated fumes; and the dilute fumes to be handled in a manner most efficient for them. At the same time, the anode carbons remain visible; the cell's heat is permitted to escape from the area of the carbons; substantially all of cell's fumes are treated without the requirement for costly, cumbersome, and time consuming separate shields; and the air curtain sharply reduces the fumes to which the operator is subjected during the carbon setting operation.

In accordance with other aspects of the invention the air flow volume of the air curtain is varied in accordance with the operation of the cell. In this regard, the air curtain flow is reduced during the cell's normal feeding and control operations but increased during times when the cell's operator is performing such operations as adjusting and changing carbons.

In acordance with another aspect of the invention, duct-work for the cell's concentrated fume gathering portions is located between curtains of air coming from the sides of the cell. In this manner, the concentrated-fume ductwork itself serves to direct the air curtain toward the dilute air duct system located above the cell.

BRIEF DESCRIPTION OF THE DRAWINGS

The foregoing and other objects, features, and advantages of this invention will be apparent from the following more particular description of prefered embodiments thereof in conjunction with the accompanying drawings wherein.

DETAILED DESCRIPTION OF A PREFERRED EMBODIMENT

Figure 1:
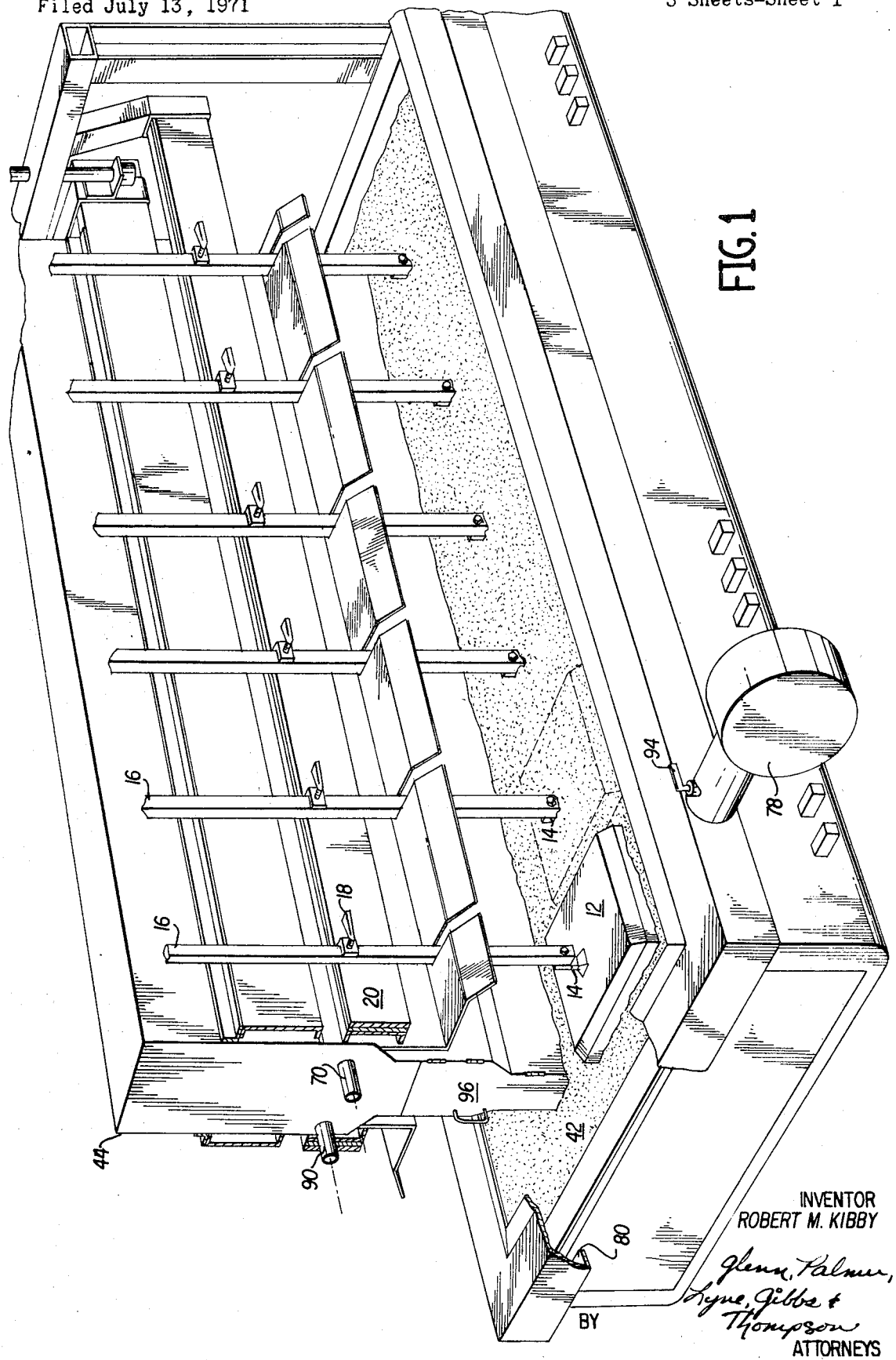
FIG. 1 is a perspective of a partially cutaway alumina reduction cell embodying the apparatus of the invention and adapted to carry out its method.

FIG. 1 represents one important type of alumina reduction cell. This type of cell is known in the industry as a "pre-bake" cell and is to be particularly distinguished from a Soderberg type of cell which is equally well known. The illustrated pre-bake cell's anode is comprised of a plurality of carbon blocks 12. The anode of a Soderberg cell, on the other hand, is comprised of a single large mass of carbon that is baked in situ during the cell's operation. Although the instant invention is applicable to either type of cell, it will be primarily described in connection with the pre-bake cell. The skilled artisan, however, will be able to apply the invention to whichever type of cell he prefers.

In the FIG. 1 schematic, each of the carbon blocks 12 is connected through an iron stub 14 and a copper anode rod 16 to a clamp 18 for affixing the rod to adjusting beam 20 which is vertically adjustable by means of jacking means not shown.

The pot portion of the cell is comprised of a steel shell 28 (FIG. 2) which is lined with both an insulating layer 30 and a carbonaceous conductive lining 32. Iron rods 34 are embedded in the lining 32 and connected to a cathode busbar not shown. The lining 32 contains a pool of molten aluminum 36 and a bath 38 of alumina ($Al_2O_3$) dissolved in an electrolyte comprised of molten cryolite.

A suitable voltage forces an electrolizing current to flow from a positive busbar, not shown, through each anode rod 16, stub 14, and carbon block 12. Current then flows from the carbon blocks through the bath 38, the molten aluminum 36, and the carbon cathode 32, after which the current is delivered to a subsequent cell by means of the iron rods 34 and the cathode busbar.

As current flows through the bath, the dissolved alumina is electrolized into its constituents, with aluminum metal accumulating in the molten aluminum layer 36.

The molten electrolyte 38 is covered by a crust 40 which consists essentially of frozen cryolite constituents and additional alumina. In this regard, a layer 42 of alumina is placed on top of the crust 40 between the individual carbons and the cell's adjacent sidewalls to protect the anode against air burning. In addition, as alumina is consumed in the bath 38, more alumina is supplied from a hopper 44.

The hopper 44 is mounted above the center portion of the bath by support beams 46 and has an outlet portion 48 having means, not shown, for controlling the discharge of alumina downwardly either into or over the bath 38.

A plurality of breaker rods 50 are vertically movable by an actuator assembly not shown. The actuator assembly may be of a conventional pneumatic or mechanical type; and the breaker rods 50 are adapted to pierce the crust 40 when placed in a lower position by the actuator assembly. The piercing action occurs every five to twenty minutes, or as frequently as necessary to prevent complete crusting over of the bath, so as to maintain a continuous set of holes 60 communicating between a lower hood member 62 and a space 64 below the crust 40.

The alumina blanket 42 is also banked up as at 66 against the sides of the lower hood member 62 to effect a gas seal. This seal, in combination with the continuous hole-forming operations of the breaker rods 50 permits concentrated pot effluent gases to pass upwardly between the lower hood member 62, through an upper hood member 68, into a concentrated fume duct 70 for delivery to a concentrated fume processor 72 (FIG. 3) such as an electrostatic precipitator or the like. After the concentrated fumes are suitably processed, they are passed to a scrubber 74 through a suitable conduit such as is schematically illustrated as line 76 in FIG. 3.

Figure 2:
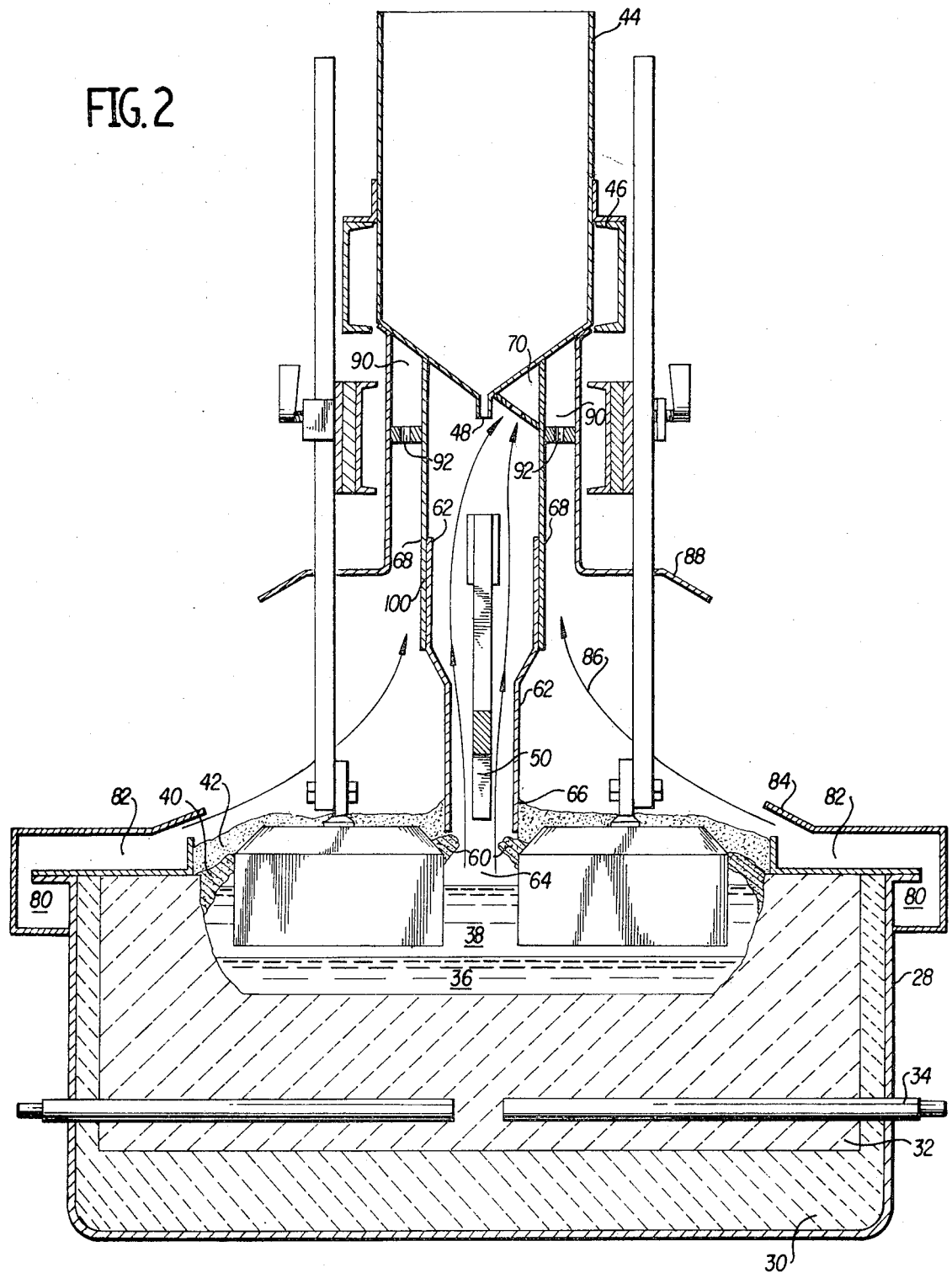
FIG. 2 is a cross-sectional transverse elevation of the cell illustrated in FIG. 1; and, FIG. 3 is a schematic illustration used in describing the method of the invention.
Figure 3:
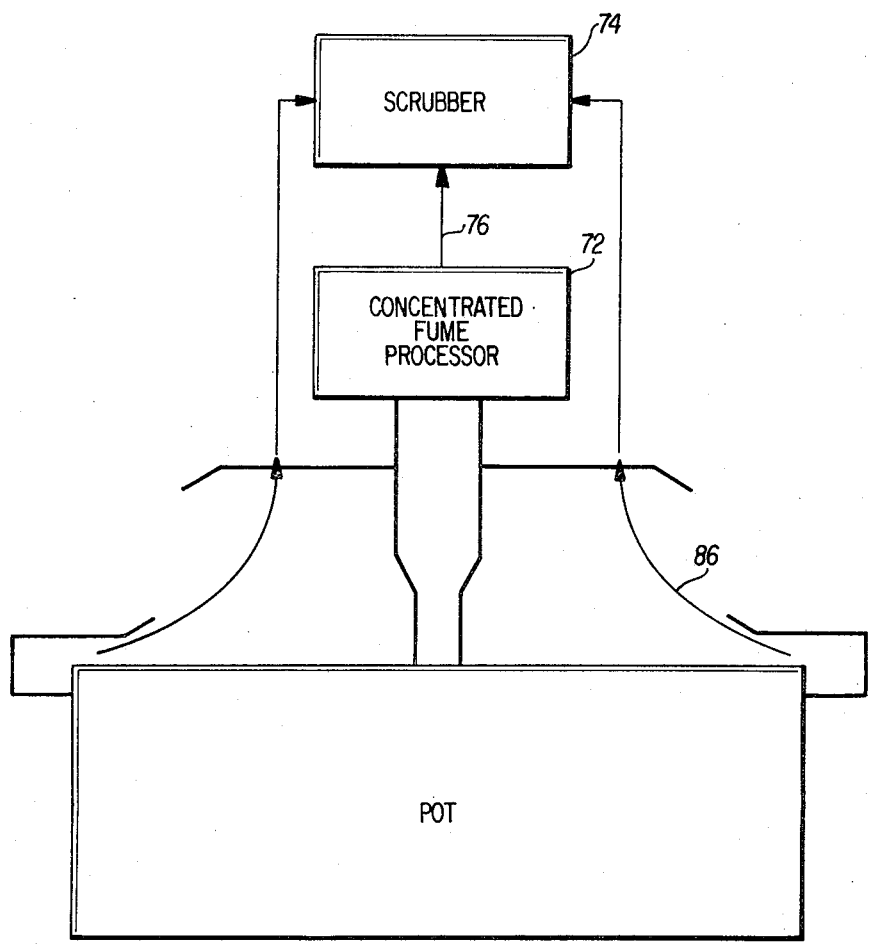

A blower 78 (FIG. 1) delivers air to ducts 80 (FIG. 2) so that it exits from a plenum chamber 82 and is directed by lower baffle members 84 in a curtain of air illustrated by arrows 86 in FIGS. 2 and 3 toward upper baffle members 88.

As the curtain of air progresses upwardly it directs fumes into dilute fume ducts 90 which include orifices 92 for balancing the draft pulled by the dilute gas duct 90; and on to a wet scrubber which, in the illustrated embodiment, is the same as that to which the processed concentrated fumes were directed.

A flow control device 94 is located between the blower and the ducts 80 for varying the flow of the air curtain 86. During normal operation of the cell, including normal feeding and anode effects, it is preferred that the air curtain flow be relatively small, because there are few fumes to be transmitted to the dilute fume system. But when it is desired to change one of the carbon anodes 12, for example, the crust 40 is broken so that some of the fumes from space 64 escape through the thusly broken crust. At these times, it is desired that the flow of the air curtain be increased.

As shown in FIG. 1, the ends of the lower hood member 62 have access panels 96 for permitting an operator to observe the portions of the cell between the rows of carbon anodes; or to "pole" the bath if desired in the event of an anode effect. Also, the lower hood member 62 is slidable along surfaces 100 thereof within the upper hood member 68 to provide still more access to the pot such as for skimming or the like.

It should also be noted that the hood members 62 and 68 extend the length of the pot so as to both facilitate the collection of gases from the air curtain; and block the flow of air across the pot. Hence, not only do the hood members 62 and 68 conduct the pot's concentrated gases upwardly to the concentrated fume duct 70, but they also assist in the direction of the pot's dilute gases into the dilute gas ducts 90.

It will be appreciated from the above description that the method and apparatus of the invention provide for the efficient collection and processing of both concentrated fumes during normal feeding and anode effect conditions of the cell; and dilute fumes during carbon-setting operations. Also, the invention does not require the use of shields or skirts which both confine the cell's heat around the anode carbon and restrict the operator's view of the cell. Similarly, it will be appreciated that the air curtain 86 considerably reduces the amount of fumes to which the cell's operator is subjected.

While the invention has been particularly shown and described with reference to a preferred embodiment thereof, it will be understood by those skilled in the art that various changes in form and detail may be made therein without departing from the spirit and scope of the invention. For example, although the invention has been described in connection with pre-baked anodes, it is also useful in connection with anodes which are baked in situ. Similarly, other types of feed and hole opening devices could be used than the breaker rods type described herein.

What is claimed is:

1. A method of collecting fumes from an electrolytic reduction cell comprising the steps of:
   collecting dilute fumes from above said cell by hood means connected to a dilute fume processor;
   collecting concentrated fumes from at least one portion of said cell and directing said concentrated fumes to a concentrated fume processor;
   processing said concentrated fumes in said concentrated fume processor; and
   processing said dilute fumes in said dilute fume processor.

2. The method of claim 1 including the step of delivering the output gases from said concentrated fume processor to a dilute fume processor.

3. The method of claim 1 including the step of directing a curtain of air upwardly above said cell for reducing the outward flow of fumes from said cell; and directing said fumes upwardly toward said dilute fume processor.

4. The method of claim 3 including the step of selectively varying the rate of flow of said air curtain.

5. The method of claim 3 including the step of delivering the output gases from said concentrated fume processor to a dilute fume processor.

6. An apparatus for collecting fumes from an electrolytic reduction cell comprising:
   a dilute fume processor;
   a concentrated fume processor;
   hood means connected to said cell for collecting dilute fumes from above said cell and directing said dilute fumes to said dilute fume processor; and,
   means for collecting concentrated fumes from at least one portion of said cell and directing said concentrated fumes to said concentrated fume processor.

7. The apparatus of claim 6 including means for delivering output gases from said concentrated fume processor to said dilute fume processor.

8. The apparatus of claim 6 including means for directing a curtain of air upwardly over the top of said cell toward said dilute fume processor whereby the outward flow of fumes from said cell is reduced.

9. The apparatus of claim 8 including means for varying the air-flow rate of said air curtain.

10. The apparatus of claim 6 for use with a cell having a fused-salt bath normally substantially covered by a crust and wherein said means for directing said concentrated fumes is movable toward and away from said crust.

11. The apparatus of claim 6 for use with a cell having a fused-salt bath normally substantially covered by a crust and including an access door in said concentrated fume collecting means for permitting a cell operator to obtain access to the underlying portion of said crust.

12. The apparatus of claim 6 for use with a cell having a fused-salt bath normally substantially covered by a crust and wherein said concentrated fume collecting means is located adjacent said crust but spaced apart therefrom so that the space therebetween is adapted to be sealed by an ore blanket.

13. The apparatus of claim 12 wherein said concentrated fume collecting means is selectively movable toward and away from said crust.

14. An electrolytic reduction cell of the type in which a shell contains a fused-salt bath normally substantially covered by a crust and having a space between said crust and said bath so that fumes from said bath are concentrated in said space and including:
   crust piercing means for periodically piercing selected portions of said crust so that concentrated fumes from said space are permitted to escape therefrom;
   concentrated fume processing means for processing said concentrated fumes;
   means for collecting said concentrated fumes and directing said concentrated fumes to said concentrated fume processor;
   a dilute fume processor; and
   means connected to said cell for collecting said dilute fumes and directing said dilute fumes to said dilute fume processor.

15. The apparatus of claim 14 including means for adding an ore blanket to said crust in the area where said crust is pierced by said crust piercing means.

16. The apparatus of claim 14 wherein said crust piercing means is located within said concentrated fume collecting means.

17. The apparatus of claim 14 including a source of air and means for passing air from said source to direct the dilute fumes toward said dilute fume collecting means.

18. The apparatus of claim 17 including means for selectively varying the flow of air from said air source.

19. The apparatus of claim 17 wherein said concentrated fume collecting means extends upwardly from said crust and is operative to impede the flow of air across said cell and direct said air flow upwardly.

References Cited

UNITED STATES PATENTS

| | | | |
|---|---|---|---|
| 3,248,177 | 4/1966 | Grolee | 204—67 X |
| 3,470,075 | 9/1969 | Johnson | 204—247 X |

TIM R. MILES, Primary Examiner

W. CUCHLINSKI, JR., Assistant Examiner

U.S. Cl. X.R.

55—7, 84, 124, 220, 316, 385, DIG. 29; 98—115 LH; 204—245, 246, 247